(12) United States Patent
Yamamoto

(10) Patent No.: US 7,598,707 B2
(45) Date of Patent: Oct. 6, 2009

(54) POWER SOURCE APPARATUS

(75) Inventor: Hiroyoshi Yamamoto, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 403 days.

(21) Appl. No.: 11/797,596

(22) Filed: May 4, 2007

(65) Prior Publication Data

US 2007/0262748 A1 Nov. 15, 2007

(30) Foreign Application Priority Data

May 9, 2006 (JP) .............................. 2006-130421

(51) Int. Cl.
*H01M 10/46* (2006.01)
(52) U.S. Cl. ..................................................... 320/128
(58) Field of Classification Search .................. 320/107, 320/112, 114, 128, 136
See application file for complete search history.

(56) References Cited

U.S. PATENT DOCUMENTS 5,099,410 A * 3/1992 Divan ........................... 363/98
6,693,414 B2 * 2/2004 Ando ........................... 323/303
2003/0071602 A1 * 4/2003 Ando ........................... 323/282

FOREIGN PATENT DOCUMENTS

| JP | 6-276699 | 9/1994 |
|---|---|---|
| JP | 7-194026 | 7/1995 |
| JP | 10-271707 | 10/1998 |
| JP | 2005-304142 | 10/2005 |
| JP | 2006-266087 | 10/2006 |

* cited by examiner

*Primary Examiner*—Edward Tso
(74) *Attorney, Agent, or Firm*—Wenderoth, Lind & Ponack, L.L.P.

(57) ABSTRACT

A voltage difference is developed between the negative input side 2c and the negative output side 2d of the voltage boost circuit 2, the negative input side 2c is connected to the negative side of the power source 5, and the negative output side 2d is connected to the negative side of the rechargeable batteries 1. Further, the load FET 3 is connected between the negative input side 2c and the negative output side 2d of the voltage boost circuit 2, and an n-channel FET is used as the load FET 3. The control circuit 4 maintains the load FET 3 in the OFF state to cut-off conduction when there is no power outage, and switches the load FET 3 ON to supply power to the load 12 from the rechargeable batteries 1 during a power outage.

12 Claims, 2 Drawing Sheets

2c··· NEGATIVE INPUT SIDE
2d··· NEGATIVE OUTPUT SIDE

POWER SOURCE APPARATUS

BACKGROUND OF THE INVENTION

1. Technical Field

This invention relates to a power source apparatus containing rechargeable batteries and in particular to a power source apparatus suitable as backup power supply.

2. Description of Related Art

A power source apparatus that houses rechargeable batteries can supply power to a load from the rechargeable batteries. Therefore, it can supply power to the load even during a power outage. The power source apparatus is maintained in a state in which rechargeable batteries are charged when there is no power outage, and power can be supplied to a load during a power outage. If the rechargeable batteries of this power source apparatus are charged at the voltage of an (external) power source, power that can be supplied during a power outage will be at a lower voltage. This is because the voltage of rechargeable batteries charged by a power source will be lower than that charging voltage, and rechargeable battery voltage will further decrease as the batteries discharge. To eliminate this drawback, a power source apparatus has been developed that boosts the power source voltage to charge the rechargeable batteries (refer to Japanese Laid-Open Patent Publication No. 2005-304142).

SUMMARY OF THE INVENTION

FIG. 1 shows the circuit diagram of the power source apparatus shown in JP2005-304142. In the power source apparatus in this circuit diagram, power source voltage output from an alternating current to direct current (AC/DC) converter 95 is boosted by a voltage boost circuit 92 to charge the rechargeable batteries 91. Given this circuit structure, the rechargeable battery charging voltage can be made higher than the power source voltage. Consequently, in the event of a power outage, voltage supplied from the rechargeable batteries 91 to a load 99 can be essentially equal to the power source voltage. A load field effect transistor (FET) 93 is connected between the rechargeable batteries 91 and the load section 99 of this power source apparatus. The load FET 93 allows output from the boost circuit 92 to be supplied only to charge the rechargeable batteries 91, and not to be supplied to the load section 99. During a power outage, the load FET 93 is turned ON to supply power to the load section 99 from the rechargeable batteries 91. When there is no power outage, the load FET 93 is controlled OFF and no power is supplied to the load section 99 from the rechargeable batteries 91.

A p-channel FET is used as the load FET in the power source apparatus of FIG. 1. The p-channel FET can be switched ON by applying a negative voltage to the gate with respect to the source, which is connected to the positive side of the rechargeable batteries 91. A negative potential with respect to the positive side of the rechargeable batteries can be obtained from the rechargeable batteries. However, the cost of a high voltage, high current p-channel FET is high compared to an n-channel FET. Further, for considerably high rechargeable battery voltage and current supplied to the load, the actual situation is that an off-the-shelf FET is not available for use.

These drawbacks can be eliminated by using an n-channel FET as the load FET. However, in a power outage, a special voltage boosted supply is required to supply the gate voltage to turn ON an n-channel load FET. This is because an n-channel load FET is turned ON by a positive potential on the gate with respect to the source. Since a voltage boosted supply must boost the DC output voltage of the rechargeable batteries, circuit structure becomes complex, such as in a DC/DC converter or charge pump circuit. Differences mentioned above between p-channel FET and n-channel FET characteristics arise because p-channel FET current is controlled by holes while n-channel FET current is controlled by electrons.

Consequently, if a p-channel FET is used as the load FET in the power source apparatus of FIG. 1, cost of the FET itself is high, and a high voltage, high current power source apparatus cannot be realized. If an n-channel FET is used, the power source apparatus has the drawback that a complex voltage boosted supply with high manufacturing cost is required.

The present invention was developed to resolve these types of drawbacks. Thus it is a primary object of the present invention to provide a power source apparatus that does not use a voltage boosted supply with complex circuit structure and high manufacturing cost, has an n-channel FET as a load FET, reduces manufacturing costs with a simple circuit structure, and can supply high voltage and high current power to a load.

The power source apparatus of the present invention is provided with the following configuration to achieve the object described above. The power source apparatus is provided with rechargeable batteries 1, a voltage boost circuit 2 to boost power source voltage and supply it to charge the rechargeable batteries 1, a load FET 3 connected between the rechargeable batteries 1 and the load 12 to control power supplied to the load 12 from the rechargeable batteries 1 when there is no input of power source voltage, and a control circuit 4 to control the load FET 3 ON and OFF. The negative input side 2c of the voltage boost circuit 2 is connected to the negative side of the power source 5, and the negative output side 2d of the voltage boost circuit 2 is connected to the negative side of the rechargeable batteries 1. There is a voltage difference between the negative input side 2c and the negative output side 2d of the voltage boost circuit 2. Further, the load FET 3, which controls power supplied from the rechargeable batteries 1 to the load 12, is connected between the negative input side 2c and the negative output side 2d of the voltage boost circuit 2. An n-channel FET serves as the load FET 3. The control circuit 4 maintains the load FET 3 in the OFF state to cut-off conduction when there is no power outage, and switches the load FET 3 ON to supply power to the load 12 from the rechargeable batteries 1 during a power outage.

A charging control switch 6 can be connected between the negative output side 2d of the voltage boost circuit 2 and the negative side of the rechargeable batteries 1 to control rechargeable battery 1 charging. The power source apparatus of the present invention can be used as a backup power supply. In addition, a diode 11 can be connected in series with the load FET 3 with its forward bias direction in the direction of current supplied from the rechargeable batteries 1 to the load 12.

The power source apparatus described above does not use a voltage boosted supply with complex circuit structure and high manufacturing cost, and it can use an n-channel FET as the load FET to control power supplied to the load. Therefore, while reducing manufacturing cost, the power source apparatus can control high voltage, high current power supplied to the load with a low-cost load FET. This characteristic of the power source apparatus of the present invention results from a circuit configuration that establishes a voltage between the negative input side and the negative output side of the voltage boost circuit. It is because the negative input side is connected to the negative side of the power source, the negative output side is connected to the negative side of the rechargeable batteries, and the load FET, which is an n-channel FET, is connected between the negative input side and the negative output side of the voltage boost circuit. As shown in FIG. 2, in a power source apparatus with this circuit configuration, rechargeable battery 1 voltage can be applied to the gate of the load FET 3 to turn it ON. This is because the positive side of the rechargeable batteries 1 is positive with respect to the source of the load FET 3, and positive rechargeable battery voltage can be applied to the gate to switch the load FET 3 ON. Further, the load FET 3 can be switched OFF when this gate voltage is not applied. Specifically, in this power source apparatus, positive rechargeable battery voltage can be applied to the gate of the n-channel load FET to switch it ON without boosting voltage via a circuit such as a DC/DC converter as in prior art power source apparatus. Consequently, the n-channel load FET can be switched ON via a simple circuit. Further, compared with a p-channel FET, a high voltage, high current off-the-shelf n-channel FET can be purchased inexpensively for use as the load FET. Therefore, high voltage, high current power can be controlled to a load using this type of load FET.

In this power source apparatus, a charging control switch, which controls rechargeable battery charging, is connected between the negative output side of the voltage boost circuit and the negative side of the rechargeable batteries, and rechargeable battery over-charging can be prevented via this charging control switch to maintain rechargeable batteries in an ideal state.

The power source apparatus can be used as a backup power supply to supply the same output voltage to a load during a power outage as is supplied when there is no power outage.

Finally, a diode is connected in series with the load FET with a polarity that supplies current to the load from the rechargeable batteries, and this diode prevents charging current flow to the rechargeable batteries when the load FET is turned ON.

The above and further objects and features of the invention will more fully be apparent from the following detailed description with accompanying drawings.

DETAILED DESCRIPTION OF THE PREFERRED EMBODIMENTS

Figure 2:
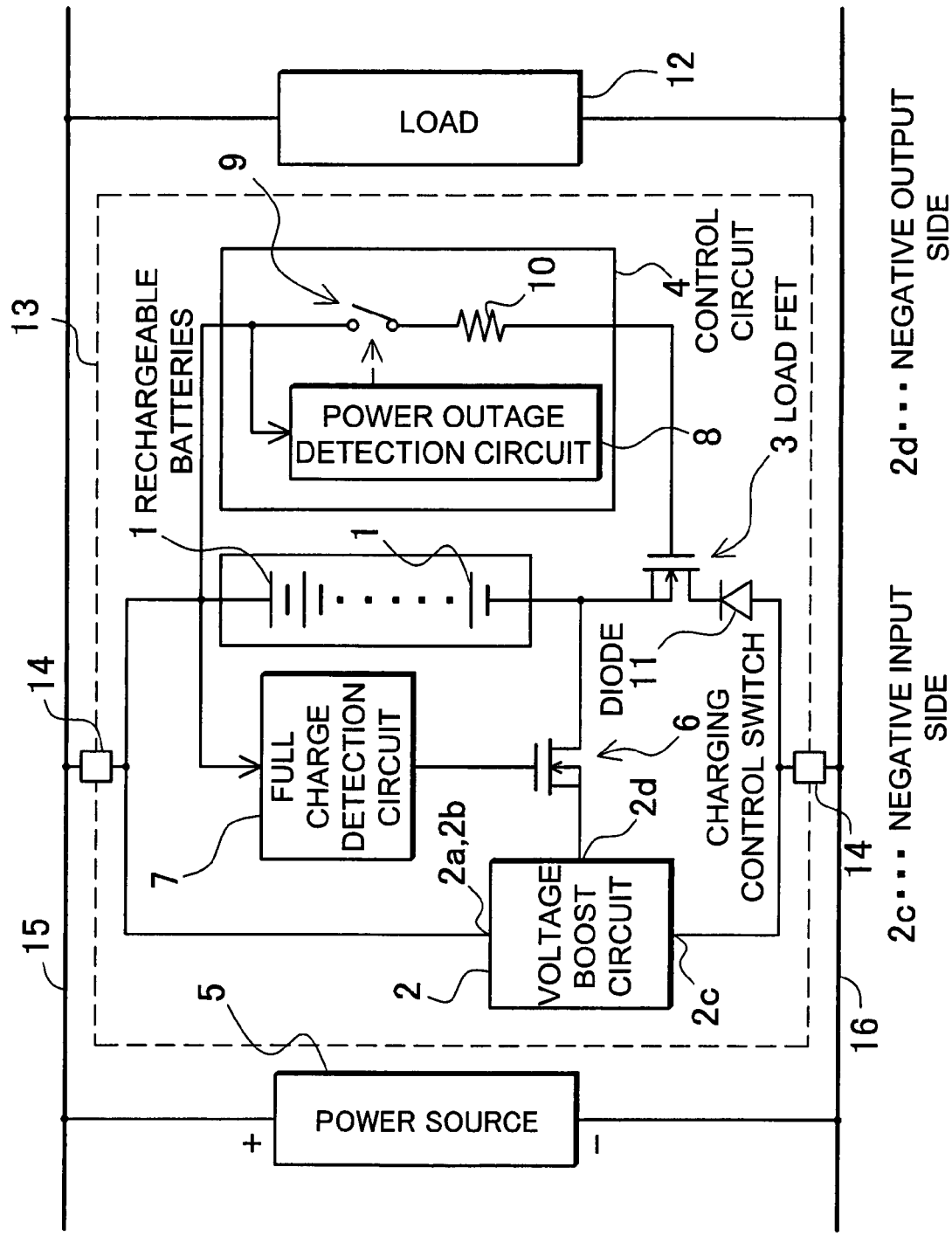
FIG. 2 is a circuit diagram of a power source apparatus for one embodiment of the present invention.

The power source apparatus shown in FIG. 2 is used as a backup power supply. This backup power supply is used as a power supply in a telephone base station or repeating station. However, the power source apparatus is not only used as a backup power supply. For example, it may be used as an uninterruptible power supply for electrical equipment such as a computer.

The power source apparatus of FIG. 2 is provided with rechargeable batteries 1, a voltage boost circuit 2 to boost power source voltage and supply it to charge the rechargeable batteries 1, a load FET 3 connected between the rechargeable batteries 1 and the load 12 to control power supplied to the load 12 from the rechargeable batteries 1 when there is no power source voltage in a power outage, and a control circuit 4 to control the load FET 3 ON and OFF. The power source apparatus of the figure is represented by the battery unit 13, which is connected via connectors to a positive power source line 15 and a negative power source line 16.

The rechargeable batteries 1 of the power source apparatus of the figure are a plurality of individual battery cells connected in series to raise the output voltage. The number of individual battery cells connected in series is adjusted to make rechargeable battery 1 output voltage during a power outage approximately equal to the normal power source voltage. Power source voltage differs depending on the electrical equipment used. For example, if power source voltage is 5V to 100V, the number of series connected individual battery cells is adjusted to make rechargeable battery 1 output voltage equal to that power source voltage. Individual battery cells are battery cells that can be recharged, such as lithium ion rechargeable batteries, nickel hydrogen batteries, or nickel cadmium batteries.

The voltage boost circuit 2 boosts power source voltage up to the rechargeable battery 1 charging voltage. Since the rechargeable batteries 1 output a voltage approximately equal to the power source voltage, they cannot be sufficiently charged at the power source voltage. Therefore, the voltage boost circuit 2 boosts the voltage of the power source to a voltage that can charge the rechargeable batteries 1. The voltage boost circuit 2 is designed with optimum voltage and output characteristics depending on the type of rechargeable batteries 1. For example, in a power source apparatus with lithium ion rechargeable batteries 1, the voltage boost circuit 2 initially charges rechargeable batteries 1 via constant current charging, followed by constant voltage charging when the rechargeable batteries 1 have been charged to a specified capacity. A voltage boost circuit that charges nickel hydrogen batteries or nickel cadmium batteries performs constant current charging until the rechargeable batteries reach full charge.

Figure 1:
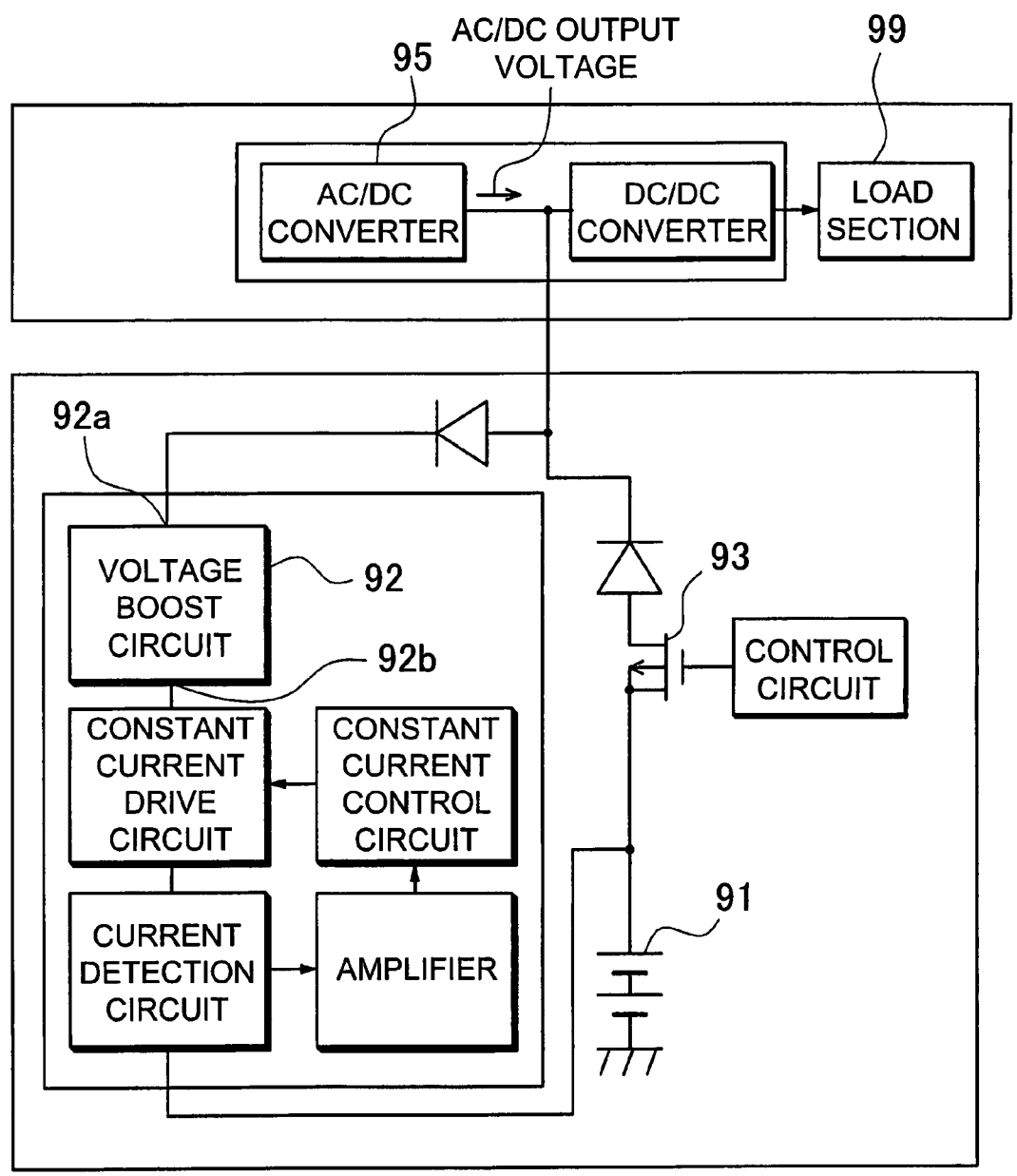
FIG. 1 is a circuit diagram of a prior art power source apparatus.

The positive input side 2a and the positive output side 2b of the voltage boost circuit 2 are common. The common input and output positive side of the voltage boost circuit 2 is connected to the positive side of the power source 5 and the positive side of the rechargeable batteries 1. A voltage difference is developed between the negative input side 2c and the negative output side 2d of the voltage boost circuit 2 to boost the output voltage relative to the input voltage. A voltage boost circuit 2 with a voltage difference between the negative input side 2c and the negative output side 2d is a specially designed circuit, which is different from prior art voltage boost circuits. The voltage boost circuit 92 shown in the prior art power source apparatus of FIG. 1 has a common input and output negative side (not illustrated) and develops a voltage difference between the positive input side 92a and the positive output side 92b to boost the output voltage higher than the input voltage.

The negative input side 2c of the voltage boost circuit 2, which develops a voltage difference at its negative side, is connected to the negative side of the power source 5, and the negative output side 2d is connected to the negative side of the rechargeable batteries 1. For example, if the power source 5 voltage is 50V and the charging voltage of the rechargeable batteries 1 is 60V, a 10V difference is developed between the negative input side 2c with respect to the negative output side 2d of the voltage boost circuit 2.

In addition, the power source apparatus of FIG. 2 has a charging control switch 6 connected between the negative output side 2d of the voltage boost circuit 2 and the negative side of the rechargeable batteries 1. This charging control switch 6 is controlled by a full charge detection circuit 7, which detects full charge of the rechargeable batteries 1. When the rechargeable batteries 1 are being charged, the full charge detection circuit 7 detects when they reach full charge and 100% remaining battery capacity. When the full charge detection circuit 7 detects full charge and 100% remaining battery capacity, it switches the charging control switch 6 OFF to suspend charging. However, as time passes, the fully charged rechargeable batteries 1 self-discharge and remaining battery capacity gradually drops from 100%. When rechargeable battery 1 remaining battery capacity drops to a specified capacity, the full charge detection circuit 7 detects this and turns ON the charging control switch 6 to fully charge the rechargeable batteries 1. When the full charge detection circuit 7 again detects full charge, it switches the charging control switch 6 OFF. In this manner, the full charge detection circuit 7 and the charging control switch 6 maintain the rechargeable batteries 1 in a fully charged state.

In addition, although it is not illustrated, a circuit element can be connected in series with the charging control switch to prevent current flow in a direction from the negative output side of the voltage boost circuit to the negative side of the rechargeable batteries. A diode or FET can be used as this circuit element to cut-off current in a reverse direction from rechargeable battery charging current. If a FET is used as this circuit element, current in both directions can be controlled by synchronizing its operation with the charging control switch. This power source apparatus has the characteristic that leakage current from the rechargeable batteries through the voltage boost circuit can be reliably prevented.

However, it is not always necessary to provide a charging control switch between the voltage boost circuit and the rechargeable batteries. For example, in a power source apparatus with rechargeable batteries that are nickel hydrogen batteries or nickel cadmium batteries, the rechargeable batteries can be maintained in a state of full charge by continuous trickle-charge with a very small current.

Since a voltage difference is developed between the negative input side $2c$ and the negative output side $2d$ of the voltage boost circuit 2, there is a voltage difference between the negative side of the power source 5 and the negative side of the rechargeable batteries 1. Consequently, if there is no power outage and the negative side of the power source 5 connects to the negative side of the rechargeable batteries 1, short circuit current will flow. To prevent this damaging event, the power source apparatus of FIG. 2 has the load FET 3, which controls power supplied from the rechargeable batteries 1 to the load 12, connected between the negative side of the power source 5 and the negative side of the rechargeable batteries 1.

The load FET 3 is controlled by the control circuit 4. The load FET 3 is switched OFF when there is no power outage and switched ON when there is a power outage. Since the load FET 3 is in the OFF state when there is no power outage, there is no short circuit current flow between the negative input side $2c$ and the negative output side $2d$ of the voltage boost circuit 2. In a power outage the load FET 3 is turned ON, and power is supplied to the load 12 from the rechargeable batteries 1. In this case, there is no input to the voltage boost circuit 2 from the power source 5, the voltage boost circuit 2 becomes inactive, and no voltage difference is developed between the negative input side $2c$ and the negative output side $2d$. Consequently, even if the load FET 3 is switched ON during a power outage, this does not short circuit the output of the voltage boost circuit 2.

The load FET 3 is an n-channel FET. The n-channel load FET has its source connected to the negative side of the rechargeable batteries 1. Therefore, the positive side of the rechargeable batteries 1 can provide a voltage that is positive with respect to the source. Consequently, the control circuit 4 can connect the positive side of the rechargeable batteries 1 to the gate of the load FET 3, which is an n-channel FET, to turn it ON. As a result, using an n-channel FET as the load FET 3, the control circuit 4 can control the load FET 3 ON by applying rechargeable battery 1 positive side voltage to its gate. The n-channel load FET 3 is OFF when no voltage is applied to its gate.

The control circuit 4 detects whether the power source 5 has a power outage or not. If there is no power outage, no voltage is applied to the gate of the load FET 3 and it is in the OFF state. If there is a power outage, positive voltage from the rechargeable batteries 1 is applied to the gate of the load FET 3 to turn it ON. The control circuit 4 can detect power source voltage and determine whether there is a power outage or not. This is because power source voltage is not input during a power outage.

The control circuit 4 of the figure is provided with a power outage detection circuit 8 to determine whether there is a power outage or not, and a control switch 9 that is switched ON and OFF by the power outage detection circuit 8. The control switch 9 is connected between the gate of the load FET 3 and the positive side of the rechargeable batteries 1 via a bias resistor 10. In this control circuit 4, if the power outage detection circuit 8 determines that a power outage has occurred, it turns the control switch 9 ON. If the power outage detection circuit 8 determines that no power outage has occurred, it turns the control switch 9 OFF. If the control switch 9 is turned ON, positive voltage from the rechargeable batteries 1 is applied to the gate of the load FET 3, and the load FET 3 turns ON. If the control switch 9 is turned OFF, no ON voltage is applied to the gate of the load FET 3, and the load FET 3 turns OFF.

The power source apparatus described above operates in the following manner to charge the rechargeable batteries 1 and to supply power to the load 12 from the rechargeable batteries 1 in a power outage.

[No Power Outage]

Power source voltage is input to the voltage boost circuit 2, the voltage boost circuit 2 boosts the voltage of the power source and maintains the rechargeable batteries 1 in a fully charged state. Here, the power outage detection circuit 8 of the control circuit 4 detects no power outage, and the control switch 9 is turned OFF. The control switch 9, which is in the OFF state, applies no ON voltage to the gate of the load FET 3. Therefore, the load FET 3 is in the OFF state. The load FET 3, which is in the OFF state, disconnects the negative input side $2c$ and the negative output side $2d$ of the voltage boost circuit 2 and prevents the flow of voltage boost circuit 2 output current through the load FET 3. Further, the load FET 3, which is in the OFF state, does not connect the rechargeable batteries 1 to the load 12 and cuts-off the supply of power from the rechargeable batteries 1 to the load 12.

[Power Outage]

Since power source voltage is no longer input to the voltage boost circuit, voltage boost circuit 2 operation stops, and rechargeable batteries 1 are no longer charged. In this state, the power outage detection circuit 8 of the control circuit 4 detects a power outage and switches the control switch 9 ON. The control switch 9, which is in the ON state, applies an ON voltage to the gate of the load FET 3. Therefore, the load FET 3 is switched ON. The load FET 3, which is ON, connects the rechargeable batteries 1 to the load 12 to supply power from the rechargeable batteries 1 to the load 12. In the power source apparatus of the figure, since a diode 11 is connected in series with the load FET 3, the rechargeable batteries 1 supply power to the load 12 via the load FET 3 and the diode 11.

Here, as a method of replacement for the diode 11, there is a method of FET configuration as an ideal diode, and there is a method of synchronizing a replacement FET with the load FET 3.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2006-130421 filed in Japan on May 9, 2006, the content of which is incorporated herein by reference.

What is claimed is:

1. A power source apparatus comprising rechargeable batteries, a voltage boost circuit to boost power source voltage and supply it to charge the rechargeable batteries, a load FET connected between the rechargeable batteries and the load to control power supplied to the load from the rechargeable batteries when there is no input of power source voltage, and a control circuit to control the load FET ON and OFF;

wherein the voltage boost circuit develops a voltage difference between its negative input side and its negative output side, the negative input side is connected to the negative side of the power source, and the negative output side is connected to the negative side of the rechargeable batteries;

wherein the load FET that controls power supplied to the load from the rechargeable batteries is connected to the negative side of the rechargeable batteries, and an n-channel FET is used as the load FET;

and wherein the control circuit maintains the load FET in the OFF state when there is no power outage, switches the load FET ON during a power outage, cuts-off load FET conduction when there is no power outage, and supplies power to the load from the rechargeable batteries during a power outage.

2. A power source apparatus as recited in claim 1 wherein a charging control switch is connected between the negative output side of the voltage boost circuit and the negative side of the rechargeable batteries to control rechargeable battery charging.

3. A power source apparatus as recited in claim 2 wherein the load FET is connected to the negative output side of the voltage boost circuit via the charging control switch.

4. A power source apparatus as recited in claim 3 wherein a full charge detection circuit is provided to detect full charge of the rechargeable batteries, and this full charge detection circuit controls the charging control switch.

5. A power source apparatus as recited in claim 1 wherein the power source apparatus is a backup power supply.

6. A power source apparatus as recited in claim 1 wherein the power source apparatus is an uninterruptible power supply.

7. A power source apparatus as recited in claim 1 wherein the rechargeable batteries are a plurality of individual battery cells connected in series.

8. A power source apparatus as recited in claim 7 wherein the rechargeable batteries are either lithium ion rechargeable batteries, nickel hydrogen batteries, or nickel cadmium batteries.

9. A power source apparatus as recited in claim 1 wherein the positive side of the voltage boost circuit is connected to the positive side of the power source and the positive side of the rechargeable batteries.

10. A power source apparatus as recited in claim 1 wherein a diode is connected in series with the load FET with a polarity that allows current to be supplied from the rechargeable batteries to the load.

11. A power source apparatus as recited in claim 1 wherein a power outage detection circuit is provided to determine if there is a power outage or if there is no power outage.

12. A power source apparatus as recited in claim 11 wherein the control circuit is provided with the power outage detection circuit and a control switch that is controlled ON and OFF by the power outage detection circuit; and the control switch is connected between the positive side of the rechargeable batteries and the gate of the load FET via a bias resistor.

* * * * *